US010808949B2

(12) United States Patent
Enzenhofer (10) Patent No.: US 10,808,949 B2
(45) Date of Patent: *Oct. 20, 2020

(54) HUMIDITY MANAGEMENT DEVICE AND METHOD (71) Applicant: Matthias Enzenhofer, Heilbronn (DE)

(72) Inventor: Matthias Enzenhofer, Heilbronn (DE)

(*) Notice: Subject to any disclaimer, the term of this patent is extended or adjusted under 35 U.S.C. 154(b) by 202 days.

This patent is subject to a terminal disclaimer.

(21) Appl. No.: 15/564,934

(22) PCT Filed: Apr. 29, 2016

(86) PCT No.: PCT/EP2016/059642
§ 371 (c)(1),
(2) Date: Oct. 6, 2017

(87) PCT Pub. No.: WO2016/174220
PCT Pub. Date: Nov. 3, 2016

(65) Prior Publication Data
US 2018/0087785 A1 Mar. 29, 2018

(30) Foreign Application Priority Data
Apr. 30, 2015 (SG) .......................... 10201503433X (51) Int. Cl.
F24F 3/14 (2006.01)
F24F 3/147 (2006.01)

(52) U.S. Cl.
CPC ............ *F24F 3/1417* (2013.01); *F24F 3/147* (2013.01); *Y02B 30/542* (2013.01)

(58) Field of Classification Search
CPC .......... F24F 3/14; F24F 3/1417; F24F 1/0087; F24F 1/0358; F24F 3/147; F24F 3/1411
See application file for complete search history.

(56) References Cited

U.S. PATENT DOCUMENTS 3,739,597 A * 6/1973 Schulze, Sr. .............. F24F 3/14
                                                      62/311
4,276,124 A * 6/1981 Mock ....................... B01D 1/26
                                                      202/236

(Continued)

FOREIGN PATENT DOCUMENTS

DE     4434720 A1 *  4/1996 ............. A63H 33/30
DE    19545335        12/1997

(Continued)

OTHER PUBLICATIONS

Beltzig, Archimedes Screw for Play Apparatus, Apr. 4, 1996, DE4434720A1, Whole Document (Year: 1996).*
Search Report.

*Primary Examiner* — Larry L Furdge
(74) *Attorney, Agent, or Firm* — Alix, Yale & Ristas, LLP (57) ABSTRACT A humidity management device, a humidity management method, an air-conditioning system, and a method of operating an air-conditioning system are disclosed. The humidity management device includes a chamber having a first end and a second end, an air inlet disposed adjacent the first end, an air outlet disposed adjacent the second end, a rotatable brush disposed between the first and second ends, the brush having a sorbent-carrying surface, and sorbent distribution means configured to distribute a sorbent over the sorbent-carrying surface. The air inlet is configured to receive input air having a first humidity level. The air outlet is configured to draw the input air to contact the sorbent-carrying surface to thereby change a moisture content of the input air such that output air exiting the air outlet has a second humidity level different from the first humidity level.

26 Claims, 7 Drawing Sheets (56) References Cited

U.S. PATENT DOCUMENTS

| | | | |
|---|---|---|---|
| 6,332,724 B1* | 12/2001 | Yano | H01L 21/67109 |
| | | | 118/52 |
| 10,022,651 B2* | 7/2018 | Enzenhofer | B01D 1/227 |
| 2002/0116935 A1* | 8/2002 | Forkosh | B01D 53/263 |
| | | | 62/93 |
| 2012/0180992 A1* | 7/2012 | Koplow | F04D 25/0606 |
| | | | 165/104.21 |
| 2013/0087043 A1 | 4/2013 | Enzenhofer | |
| 2014/0223947 A1* | 8/2014 | Ranjan | F24F 3/1417 |
| | | | 62/271 |

FOREIGN PATENT DOCUMENTS

| | | |
|---|---|---|
| EP | 0959307 | 11/1999 |
| EP | 2767771 | 8/2014 |
| WO | WO2009094032 | 7/2009 |

* cited by examiner

HUMIDITY MANAGEMENT DEVICE AND METHOD

FIELD OF INVENTION

The present invention relates broadly, but not exclusively, to a humidity management device and method, to an air-conditioning system, and to a method of operating an air-conditioning system.

BACKGROUND

The contacting of a gas with a liquid can find application in practice in a lot of fields. For example, the contact of a gas with a liquid can be used to remove volatile substances from a liquid. In such application, the liquid can, for example, be purified and, after for example a reprocessing treatment, can be recycled, while the volatile substances dissolved in the liquid can be collected.

The contact of the gas phase with a liquid medium can also be used, for example, to mix the gas with the liquid medium. In practice, air for example can be moistened to achieve a more pleasant indoor climate. Conversely, humid air can be dehumidified through contact with a liquid sorbent, which can remove moisture from the humid air. Such humidification and dehumidification are typically used in heating, ventilation and air-conditioning (HVAC) or climate control systems to provide air having the desired humidity and/or temperature.

To moisten the air at room temperature sufficiently, a large evaporation surface is typically needed, but this is commonly not available. Further, in order to reprocess and recycle the liquid sorbent, significant amounts of energy may be required, thus reducing the energy efficiency of the system. This can be undesirable in the context of increasing sustainability and climate-change awareness.

Prior art air-conditioning systems are disclosed in Patent Publication No. EP 2767771 A1 and DE 19545335 A1, in which the regeneration of the liquid sorbent is achieved by membrane-supported desorption. However, these prior art systems have the limitation that that the contact surface between the gas and the liquid sorbent is limited.

In an existing solution as disclosed in Patent Publication No. US 2013/0087043 A1, the contact surface between a gas, such as air, and a liquid sorbent is increased by guiding the gas past multiple carriers moistened with the liquid sorbent. The carriers in this publication are fixed porous tubes or filaments through which the liquid sorbent can flow. It is noted that in this device, the surface portions of the carriers not directly facing the gas flow may not be fully utilized, thus reducing the overall efficiency of the device.

Thus, there exists a need to provide devices and methods for humidity management, as well as air-conditioning systems, that address at least one of the above problems or provide a useful alternative.

SUMMARY

A humidity management device comprises:
a chamber having a first end and a second end;
an air inlet disposed adjacent the first end;
an air outlet disposed adjacent the second end;
a rotatable brush disposed between the first and second ends, the brush having a sorbent-carrying surface; and
sorbent distribution means configured to distribute a sorbent over the sorbent-carrying surface,
wherein the air inlet is configured to receive input air having a first humidity level; and
wherein the air outlet is configured to draw said input air to contact the sorbent-carrying surface to thereby change a moisture content of said input air such that output air exiting the air outlet has a second humidity level different from the first humidity level.

The sorbent distribution means may comprise a sorbent inlet disposed adjacent the second end and configured to dispense a liquid sorbent onto the sorbent-carrying surface of the brush.

The sorbent distribution means may further comprise:
a sorbent reservoir disposed adjacent the first end; and
a conveyor configured to transport a portion of the sorbent collected at the sorbent reservoir to the second end for distribution over the sorbent-carrying surface.

The conveyor may comprise an Archimedes' screw having a lower end in fluid communication with the sorbent reservoir.

The humidity management device may further comprise an actuator coupled to the conveyor to drive the conveyor.

The actuator may be further coupled to the brush to rotate the brush.

The brush may comprise a plurality of bristles, the bristles providing the sorbent-carrying surface.

The bristles may be hollow.

The sorbent-carrying surface may be porous.

The humidity management device may be operable as a dehumidifier unit, and the sorbent may be configured to remove moisture from the input air such that the second humidity level is lower than the first humidity level.

A temperature of the input air may be higher than a temperature of the sorbent.

The humidity management device may be operable as a desorber unit, and the sorbent may be configured to release moisture into the input air such that the second humidity level is higher than the first humidity level.

A temperature of the input air may be lower than a temperature of the sorbent.

An air-conditioning system comprises:
a dehumidifier unit comprising the humidity management device as defined in the first aspect;
a regenerator unit disposed downstream of the dehumidifier unit, wherein the regenerator unit is configured to receive a moisture-high sorbent from the dehumidifier unit, and to remove moisture from said moisture-high sorbent; and
a sorbent circuit configured to circulate the moisture-high sorbent from the dehumidifier unit to the regenerator unit and a moisture-low sorbent from the regenerator unit back to the dehumidifier unit.

The system may further comprise a heater connected to the sorbent circuit between the dehumidifier unit and the regenerator unit, and configured to heat the moisture-high sorbent being circulated from the dehumidifier unit to the regenerator unit.

The heater may comprise a solar heater.

The regenerator unit may comprise a desorber unit comprising the humidity management device as defined in the first aspect.

The regenerator unit may comprise a pervaporation unit configured to separate and vaporize the moisture from the sorbent through a membrane.

The system may further comprise a heat exchanger disposed downstream of the dehumidifier unit, the heat exchanger configured to receive the output air from the dehumidifier unit and cool said output air using a flow of waste air.

The system may further comprise an evaporation humidifier disposed downstream of the heat exchanger for adiabatically cooling the air received from the heat exchanger.

A humidity management method comprises the steps of:
providing a chamber having a first end and a second end, wherein an air inlet is disposed adjacent the first end, an air outlet is disposed adjacent the second end, and a rotatable brush is disposed between the first and second ends, the brush having a sorbent-carrying surface;
distributing a sorbent over the sorbent-carrying surface;
supplying input air having a first humidity level to the chamber through the air inlet; and
drawing said input air from the air inlet to the air outlet such that the input air contacts the sorbent-carrying surface to thereby change a moisture content of said input air and such that output air exiting the air outlet has a second humidity level different from the first humidity level.

Distributing a sorbent over the sorbent-carrying surface may comprise transporting a portion of a liquid sorbent from a sorbent reservoir disposed adjacent the first end to the second end using an Archimedes' screw.

A method for operating an air-conditioning system comprises the steps of:
operating a first humidity management device as defined in the first aspect as a dehumidifier unit;
circulating a moisture-high absorbent from the dehumidifier unit to a regenerator unit downstream thereof;
removing moisture from the moisture-high absorbent at the regenerator unit; and
circulating a moisture-low absorbent from the regenerator unit back to the dehumidifier unit.

The regenerator unit may comprise a second humidity management device.

The regenerator unit may comprise a pervaporation unit and removing the moisture from the moisture-high sorbent may comprise separating and vaporizing the moisture using a membrane.

Circulating the moisture-high absorbent from the dehumidifier unit to the regenerator unit may comprise heating the absorbent using a solar heater.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

In the example embodiments that follow, the contact between a gas and a liquid is described in relation to the interaction or mixing of an air flow and a liquid adsorbent or absorbent. However, it will be appreciated that the devices and methods as described can find application in other gas-liquid interactions, such as the cleaning of exhaust gases, the removal of volatile substances from liquid mixtures, etc.

Figure 1:
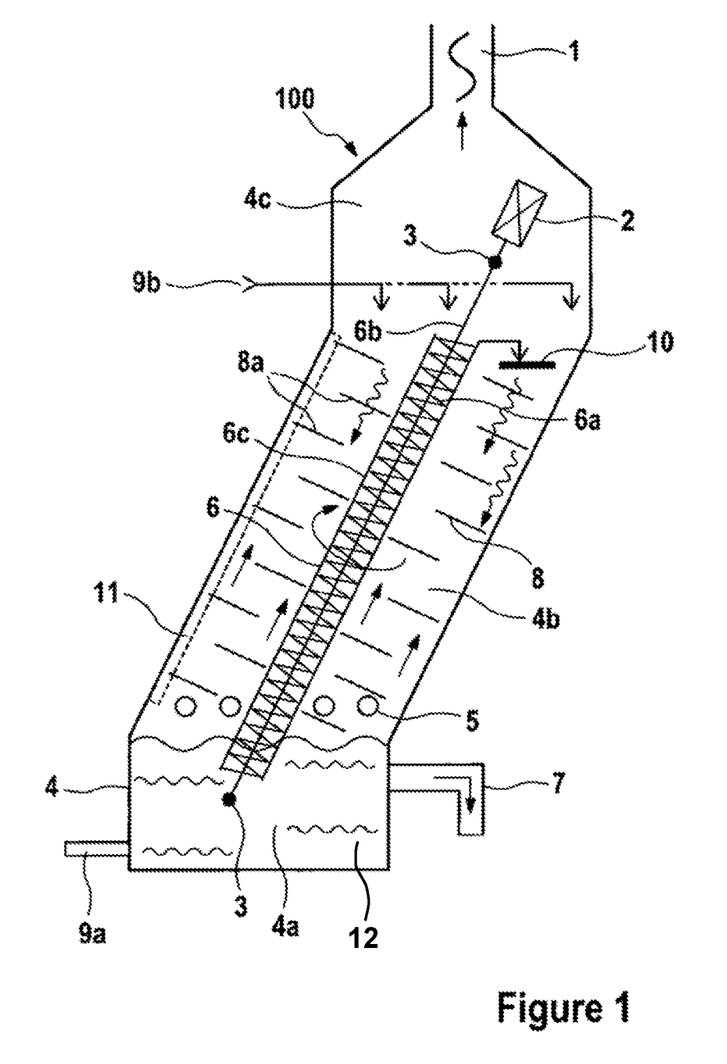
FIG. 1 shows a schematic diagram of a humidity management device according to an example embodiment.

FIG. 1 shows a schematic diagram of a humidity management device 100 according to an example embodiment. The humidity management device 100 comprises a casing or chamber 4 having a lower section 4a (hereinafter interchangeably referred to as the first end 4a), a middle section 4b and an upper section 4c (hereinafter interchangeably referred to as the second end 4c). As shown in FIG. 1, the middle section 4b is tilted in relation to the lower section 4a and the upper section 4c. Further, the casing 4 includes one or more gas inlets 5 adjacent the lower section 4a and a gas outlet at the top end of the upper section 4c, where there can be assembled a ventilator 1 to produce a gas flow, typically an air flow, from the gas inlets 5 to the upper section 4c of the casing or chamber 4.

The humidity management device 100 also includes one or more first liquid inlets 9b adjacent the second end 4c. A brush 8 having a plurality of bristles 8a is disposed in the middle section 4b below the one or more liquid inlets 9b, such that a liquid sorbent, e.g. a liquid absorbent or adsorbent, that is dispensed from the one or more liquid inlets 9b can moisten the bristles 8a of the brush 8 with the liquid sorbent. The bristles 8a preferably are made of an elastic material and advantageously possess a porous surface. Additionally, the bristles 8a can be hollow to carry more of the fluid and effectively increase the time of the fluid in the chamber 4. As a result, the chamber 4 can be moistened in the middle section 4b with the introduced liquid medium and serves as a contact surface for the liquid medium. Under the effect of gravity, the liquid flows through the middle section 4b, e.g. between bristles 8a or along an inner surface of the casing 4, and is collected at a reservoir 12 at the bottom of the casing 4 adjacent the lower section 4a. In some implementations, the humidity management device 100 further includes a second liquid inlet 9a as well as an outlet 7 in fluid communication with the reservoir 12.

As shown in FIG. 1, at least a portion of the liquid collected at the reservoir 12 is transported upward using a conveyor, and distributed over the bristle 8a of the brush 8. Here, the conveyor is in the form or an Archimedes' screw 6 which runs parallel to the axis of the middle section 4b of the humidity management device 100. The Archimedes' screw comprises a tube 6c containing a loop 6a and a drive axle 6b, which is driven by an actuator in the form of a motor 2 and which is pivot-mounted to bearing 3. Through the axle 6b, the loop 6a is rotatable. One end of the Archimedes' screw is in fluid communication with the reservoir 12 while the other end is in fluid communication with a fluid distribution part 10 which is disposed in the upper section 4c of casing 4. When the motor 2 is powered, it can rotate the loop 6a to transport a portion of the liquid from the reservoir 12 to the distribution part 10, which can distribute transported fluid over the bristles 8a of the brush 8.

Figure 2:
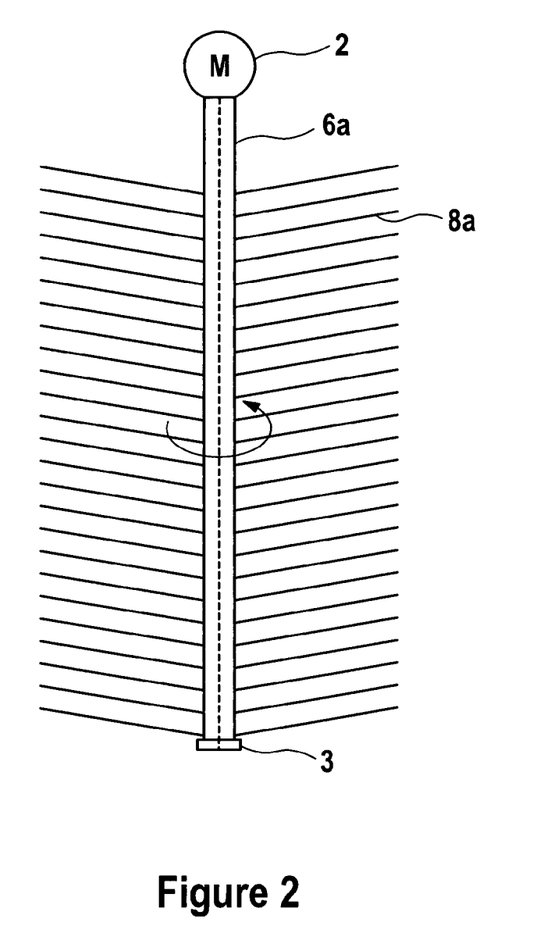
FIG. 2 shows a schematic diagram of the brush used in the humidity management device of FIG. 1.

FIG. 2 shows a schematic diagram of the brush 8 used in the humidity management device 100 of FIG. 1. The brush 8 is rotatable and therefore can be coupled to the motor 2 to be driven by the motor 2. For example, the bristles 8a are attached to the spindle or axle 6b which is mounted to bearing 3 at one end and coupled to the motor 2 at the other end. In one implementation, the brush 8 is connected to the Archimedes' screw 6 such that the brush 8 is also rotational when the Archimedes' screw 6 is driven by the motor 2. Alternatively, the brush 8 can be drivable independently of the Archimedes' screw 6. Also, in alternate embodiments, the conveyor may take a different form, such as a pump device.

With reference to FIG. 1, the operation of the humidity management device is now described. Typically, a liquid sorbent (absorbent or adsorbent) is introduced into the chamber 4 via the one or more first liquid inlets 9b and optionally via the second liquid inlet 9a. Moreover, within the chamber 4, the liquid sorbent which is collected in the lower section 4a, is lifted by using the Archimedes' screw 6 and is conveyed to the distribution part 10. The distribution part 10 thereby distributes the liquid sorbent across the upper surface of the brush 8, so that the liquid sorbent is moved by gravity back to the lower section 4a of the chamber. Because of the rotational motion of the Archimedes' screw, the brush 8 connected thereto is simultaneously put into motion. Additionally, because of the ventilator 1 and gas inlets 5, an air flow is produced from gas inlets 5 to the upper section 4c.

The surfaces of the individual bristles 8a and the brush 8 are moistened by the liquid sorbent, which is distributed across the upper surface of the brush 8, and serves as a contact surface for the liquid sorbent. The effective contact area between the sorbent and the air flow can therefore be increased by a multiple compared to the surface of the collected liquid sorbent in the reservoir 12 in the lower section 4a even with a compact structural shape.

During rotation of the brush 8, the bristles 8a contact the inner surface of the middle section 4b of the casing 4 and continuously replace the liquid flowing on the inner surface of the middle section 4. A protruding part 11 parallel to the axle 6b may be provided in the middle section 4b of the casing 4 to contact at least partially with the bristles 8a of brush 8 and additionally excite the bristles 8a into a swinging motion. Through the swinging motion of the bristles 8a, a fine droplet mist of the liquid sorbent, which provides an additional contact surface for the liquid medium, can be created in the chamber 4. In other words, the interaction between the air flow and the liquid sorbent can be more thorough. The liquid sorbent which has contacted the air flow, flows back through gravity into the reservoir 12 at the lower section 4a of the chamber 4 and can be discharged via outlet 7.

When using humidity management device 100 as described above to dehumidify or humidify air, the interaction between the air flow and the liquid sorbent can be further enhanced by introducing a temperature difference between the air flow and the liquid sorbent. For example, to promote the removal of moisture from the air flow, the air flow can be heated while the liquid sorbent can be cooled. Conversely, to promote the evaporation of water from the liquid sorbent and release into the air flow, the liquid sorbent can be heated while the air flow can be cooled.

In an embodiment of the humidity management device 100, the brush frame of the brush 8 and the tube 6c can be made as one piece. In this embodiment, the tube 6c can serve as a brush frame for brush 8 and the bristles 8a are connected directly to the tube 6c. It is particularly advantageous if the bristles 8a are hollow and the tube 6c is formed in such a way that the bristles 8a can be directly supplied with the liquid sorbent, which is being transported by the Archimedes' screw 6. As a result, additional liquid can be applied to the inner surface of the middle section 4b of casing 4, which renders the casing wall to be a contact surface between the air flow and the liquid sorbent.

The humidity management device 100 of FIG. 1 can be configured to operate as a dehumidification unit of an air-conditioning system. In such application, the gas being supplied to the gas inlets 5 is typically humid input air, while the liquid sorbent supplied to inlets 9b and/or 9a is a moisture-low adsorbent or absorbent. Through contact between the humid air and the liquid sorbent in the chamber 4, moisture is removed from the input air such that output air exiting the ventilator 1 has a humidity level lower than that of the input air. Preferably, the temperature of the input air is higher than the temperature of the liquid sorbent, and the output air may be partially cooled as a result of it contacting the liquid sorbent. The moisture-high sorbent collected at the reservoir 12 at the lower section 4a can be discharged or, recycled after reprocessing.

Conversely, the humidity management device 100 of FIG. 1 can also be configured to operate as a humidification unit of an air-conditioning system. In such application, the gas being supplied to the gas inlets 5 is typically dry input air, while the liquid sorbent supplied to inlets 9b and/or 9a can be water or a water-carrying liquid. Through contact between the dry air and the liquid sorbent in the chamber 4, moisture is removed from liquid sorbent into the air flow such that output air exiting the ventilator 1 has a humidity level higher than that of the input air. Preferably, the temperature of the input air is lower than the temperature of the liquid sorbent to promote evaporation of water from the liquid sorbent and release into the air.

The humidity management device 100 of FIG. 1 can further be configured to operate as a desorber unit to remove water and regenerate the liquid sorbent. Such application is similar to the humidifier unit described above; however, output air from the regenerator/desorber unit is typically released to the outdoor environment rather than to a room or place of comfort. Here, a moisture-high sorbent is supplied to the liquid inlets 9b/9a and, by passing the chamber 4, comes into contact with the dry input air. Water is removed, e.g. evaporated, from the sorbent such that a moisture-low or moisture-free sorbent that is collected at the lower section 4a of the chamber 4 can be recycled or reused, e.g. in the dehumidification unit of an air-conditioning system.

Figure 3A:
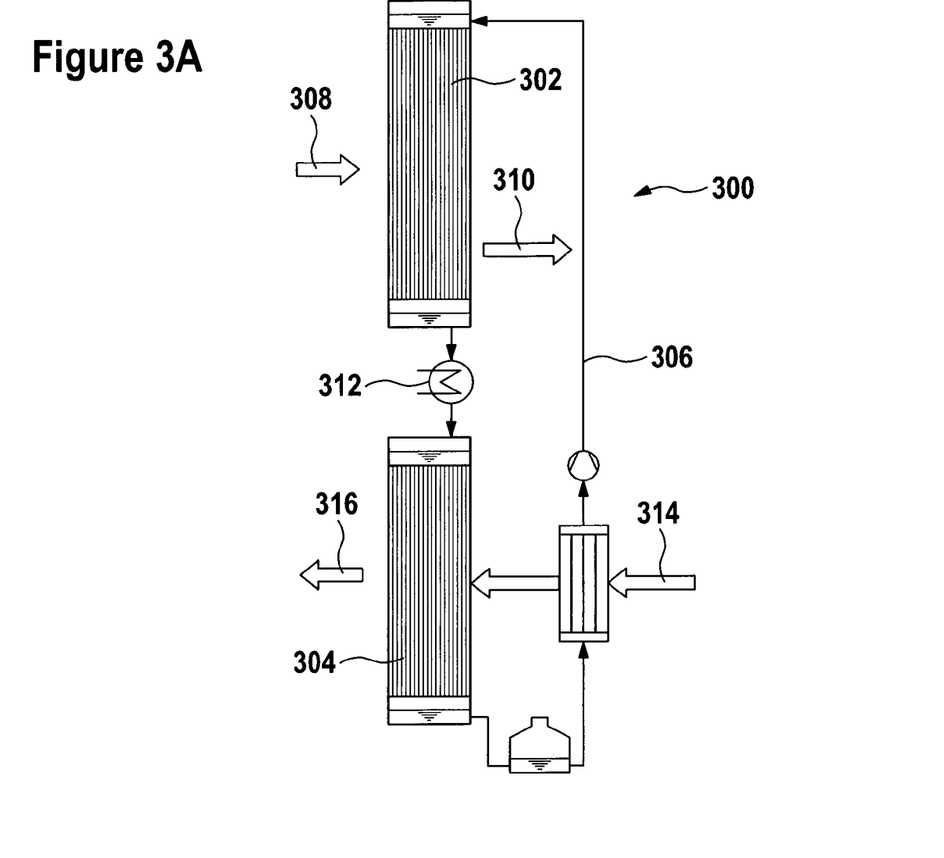
FIG. 3A shows a schematic diagram of an air-conditioning system according to an example embodiment.
Figure 3B:
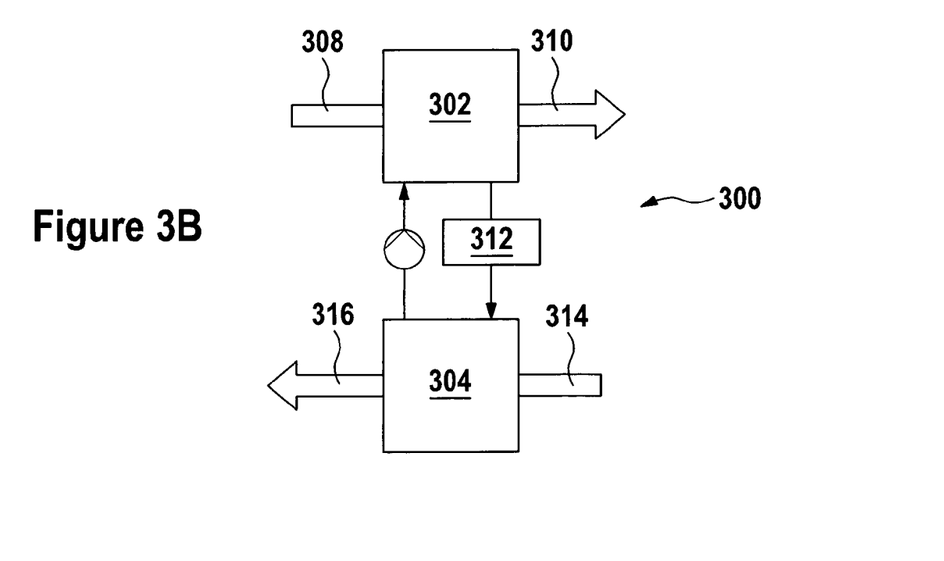
FIG. 3B shows a block diagram of the air-conditioning system of FIG. 3A.

As described above, the humidity management device 100 can find various uses in an air-conditioning system. FIG. 3A shows a schematic diagram of such an air-conditioning system 300 according to an example embodiment. FIG. 3B shows a block diagram of the air-conditioning system 300 of FIG. 3A.

The air-conditioning system 300 includes a dehumidifier unit 302, a regenerator unit 304 disposed downstream of the dehumidifier unit 302, and a sorbent circuit 306 configured to circulate a moisture-high sorbent from the dehumidifier unit 302 to the regenerator unit 304 and a moisture-low sorbent from the regenerator unit 304 back to the dehumidifier unit 302. Input air 308, typically humid outdoor air, is supplied to the dehumidifier unit 302, and dry output air 310 from the dehumidifier unit 302 may be directly provided to a room or place of comfort, or alternatively, further cooled, filtered, etc. before being supplied to a room or place of comfort. The moisture-high liquid sorbent, having adsorbed or absorbed moisture from the humid outdoor air 308, is circulated (transported) in the sorbent circuit 306 to the regenerator unit 304. In an embodiment, a heater 312, such as an electric heater or solar heater, is connected to the sorbent circuit 306 between the dehumidifier unit 302 and the regenerator 304 to pre-heat the moisture-high sorbent being transported to the regenerator unit 304.

At the downstream, waste air 314 from the room or place of comfort is supplied to the regenerator unit 304 to contact with, and thereby evaporating water from, the moisture-high sorbent received from the sorbent circuit 306. The moisture-low or moisture-free liquid sorbent is circulated back to the dehumidifier unit 302 while humid exhaust air 316 is released to the outdoor environment.

The dehumidifying capacity of the dehumidifier unit may be controlled using various parameters including, but are not limited to, the flow rates of the liquid sorbent and input air respectively, temperature difference between the sorbent and the input air, contact surface between the sorbent and the input air, thermal and chemical properties of the sorbent material, etc. Strong hydrophilic liquids, in particular polar liquids such as polyhydric alcohols that can bind water efficiently, may be used as sorbents in the example embodiments. The regenerating capacity of the regenerator unit 304 can likewise be configured. It is noted that the humidity management device 100 of FIG. 1 is particularly suitable as the dehumidifier unit 302 and/or regenerator unit 304, since it can provide a large effective contact area between the sorbent and the air.

It will be appreciated that, in a different operating environment, the input air 308 may be dry outdoor air, in which case the dehumidifier unit 302 may be replaced by a suitable humidifier unit based on the humidity management device 100 as described above. In other words, various other configurations and permutations are possible in addition to the example provided above.

Figure 4A:
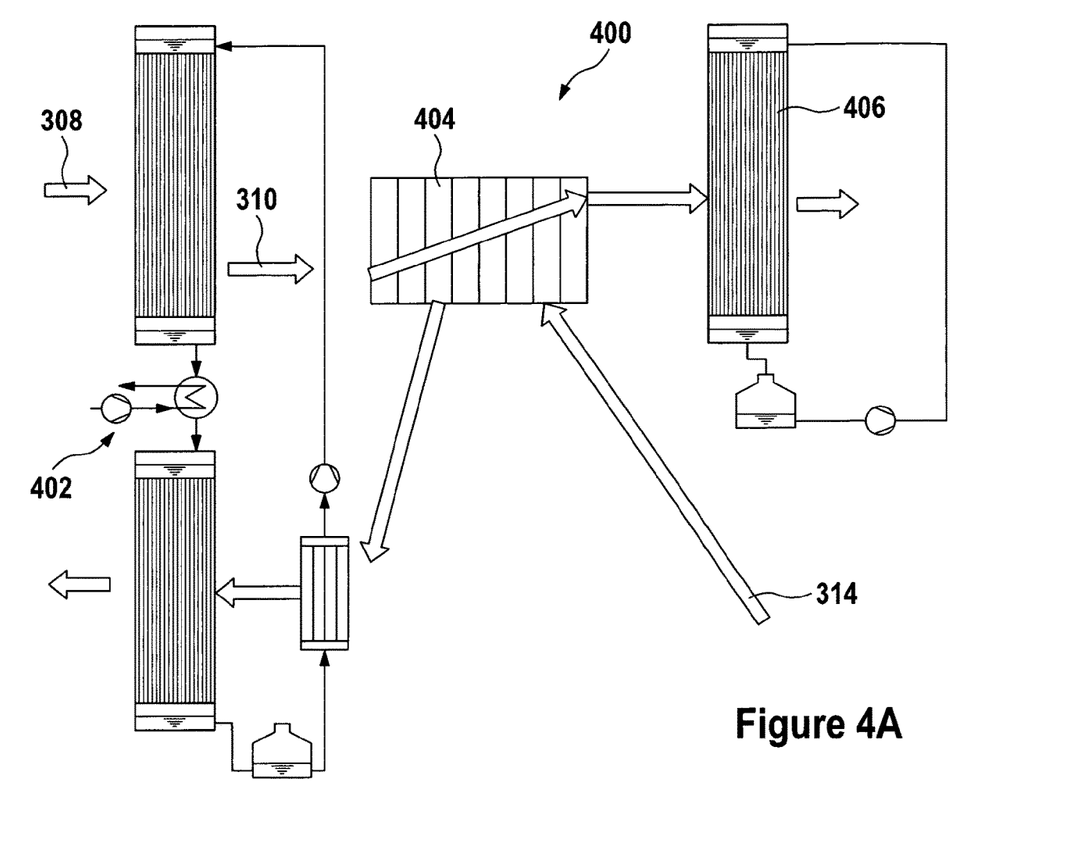
FIG. 4A shows a schematic diagram of an air-conditioning system according to another embodiment.
Figure 4B:
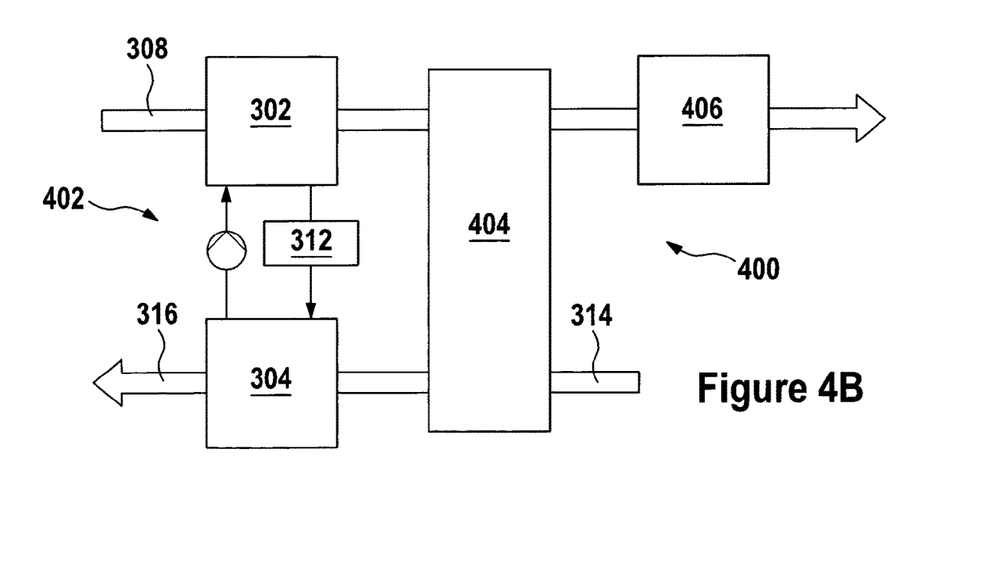
FIG. 4B shows a block diagram of the air-conditioning system of FIG. 4A.

FIG. 4A shows a schematic diagram illustrating an air-conditioning system 400 according to another example embodiment. FIG. 4B shows a block diagram of the air-conditioning system 400 of FIG. 4A. Here, like numerals denote like elements as described in FIGS. 3A-3B. The air-conditioning system 400 includes a base module 402 in the form of the air-conditioning system 300 as described above with respect to FIGS. 3A-3B, and an additional heat exchanger module 404 and climate control module 406. The climate control module 406 is disposed downstream of the heat exchanger module 404. An example climate control module 406, such as an evaporation humidifier, is provided in FIG. 6.

In this embodiment, output air 310 from the dehumidifier unit 302 undergoes heat exchange at the heat exchanger module 404 with waste air 314 from the room or place of comfort, and is cooled as a result. Various types of heat exchangers are suitable for use in the heat exchange module 404, and examples include the shell and tube heat exchanger, the adiabatic wheel heat exchanger, etc., where the two flows of air do not come into contact with each other. The climate control module 406 may further adjust the humidity level and/or temperature of the air before providing the conditioned air to the room or place of comfort. The modular configuration of the air-conditioning system 400 allows the various modules to be combined based on the operating requirements. For example, the heat exchanger 404 may be omitted and the output air from the dehumidifier unit 302 is provided directly to the climate control module 406. Likewise, the climate control unit 406 may be omitted and cooled input air is provided directly from the heat exchange module 404 to the room or place of comfort.

Figure 5:
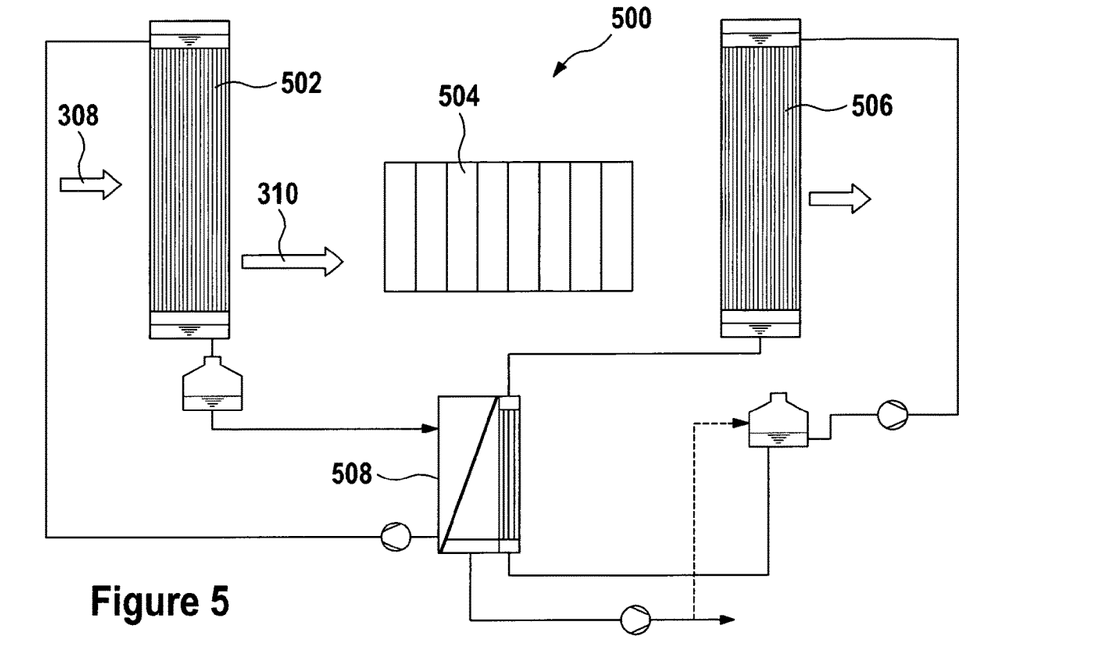
FIG. 5 shows a schematic diagram of an air-conditioning system according to yet another embodiment.

FIG. 5 shows a schematic diagram illustrating an air-conditioning system 500 according to yet another example embodiment. The air-conditioning system 500 includes a dehumidifier unit 502 in the form of the humidity management device 100 described above with reference to FIG. 1. An optional heat exchanger module 504 may be disposed downstream of the dehumidifier unit 502, and a climate control module 506 may be disposed downstream of the heat exchanger module 504. A regenerator unit 508 is connected to the dehumidifier unit 502 by a sorbent circuit.

In this embodiment, the regenerator unit 508 is in the form of a pervaporation module, in which water can be separated from the liquid sorbent through a membrane and therefore the water content in the sorbent can be regulated via the partial pressure of the water on the permeat side and the pressure flow. The separated water can be condensed on the permeat side and can be removed. Alternatively, the water can be recycled after purification, e.g. in the humidification of the incoming air to the climate control module 506 for adiabatic cooling, as shown in FIG. 5. In other words, the waste air from the room, or optionally from the heat exchange 504, is not used in the regeneration unit 508.

Figure 6:
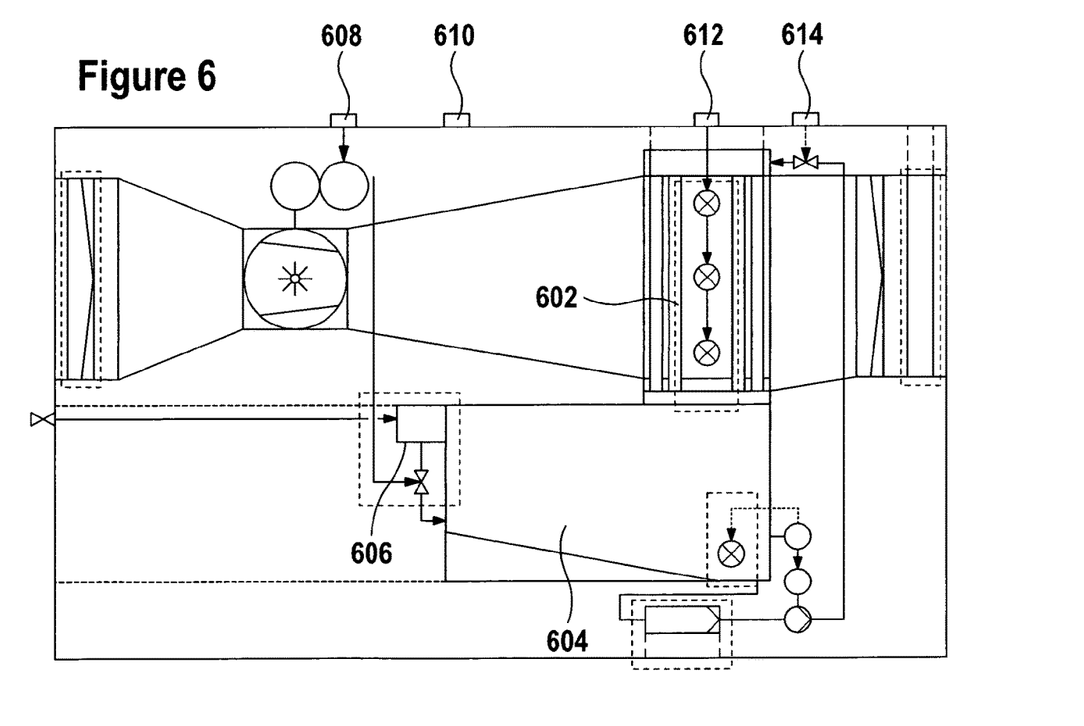
FIG. 6 shows a schematic diagram of a humidifier unit suitable for use in the air-conditioning system of the example embodiments.

FIG. 6 shows a schematic diagram illustrating an example climate control module 600 suitable for use in the air-conditioning system of the example embodiments. Typically, the climate control module 600 includes a humidifier unit 602 having a water container 604 connected thereto, to provide the water for moistening the air. A scent or perfume container 606 is connected to the water container 604 to dispense a desired scent or perfume to give the room served by the climate control module 600 a pleasant smell. The climate control module 600 further includes various regulators such as an air amount regulator 608, a scent dosage regulator 610, a light dimmer 612, and a humidity regulator 614. Other optional parts such as particle filter for the incoming air, ion exchange chalk filter for the water, anti-condensation pad, etc. may also be provided.

Figure 7:
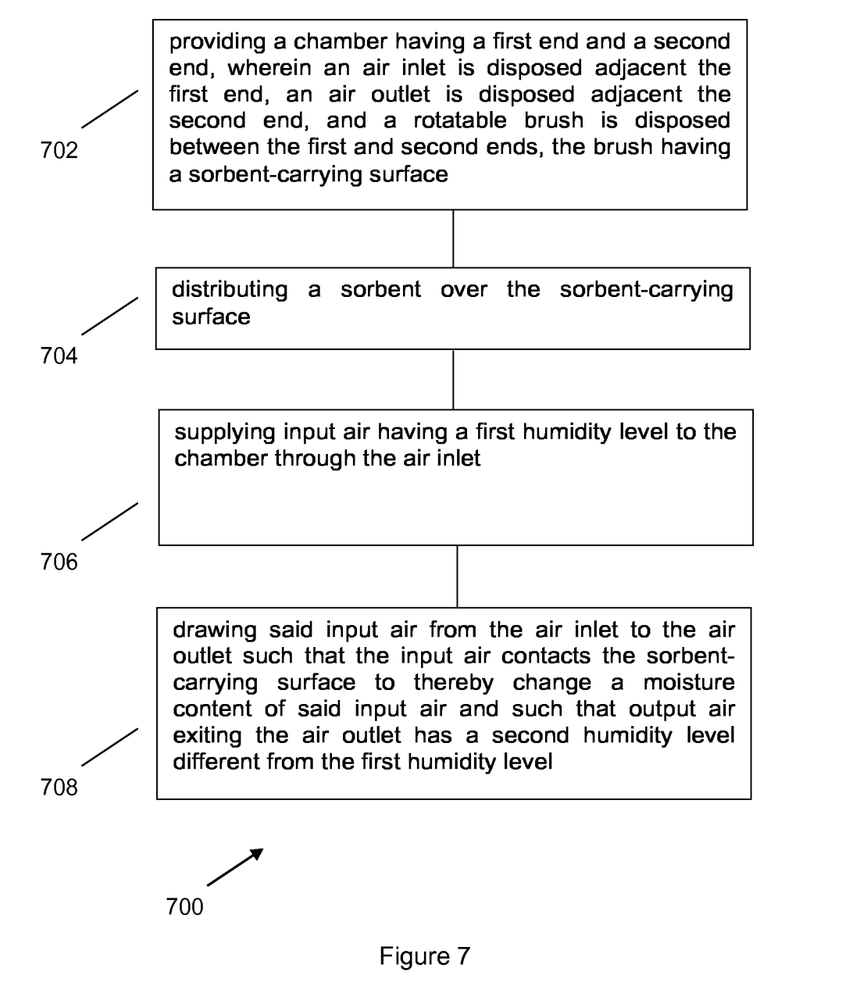
FIG. 7 shows a flow chart illustrating a humidity management method according to an example embodiment.

FIG. 7 shows a flow chart 700 illustrating a humidity management method according to an example embodiment. At step 702, a chamber is provided having a first end and a second end, wherein an air inlet is disposed adjacent the first end, an air outlet is disposed adjacent the second end, and a rotatable brush is disposed between the first and second ends, the brush having a sorbent-carrying surface. At step 704, a sorbent is distributed over the sorbent-carrying surface. At step 706, input air having a first humidity level is supplied to the chamber through the air inlet. At step 708, the input air is drawn from the air inlet to the air outlet such that the input air contacts the sorbent-carrying surface to thereby change a moisture content of the input air and such that output air exiting the air outlet has a second humidity level different from the first humidity level.

Figure 8:
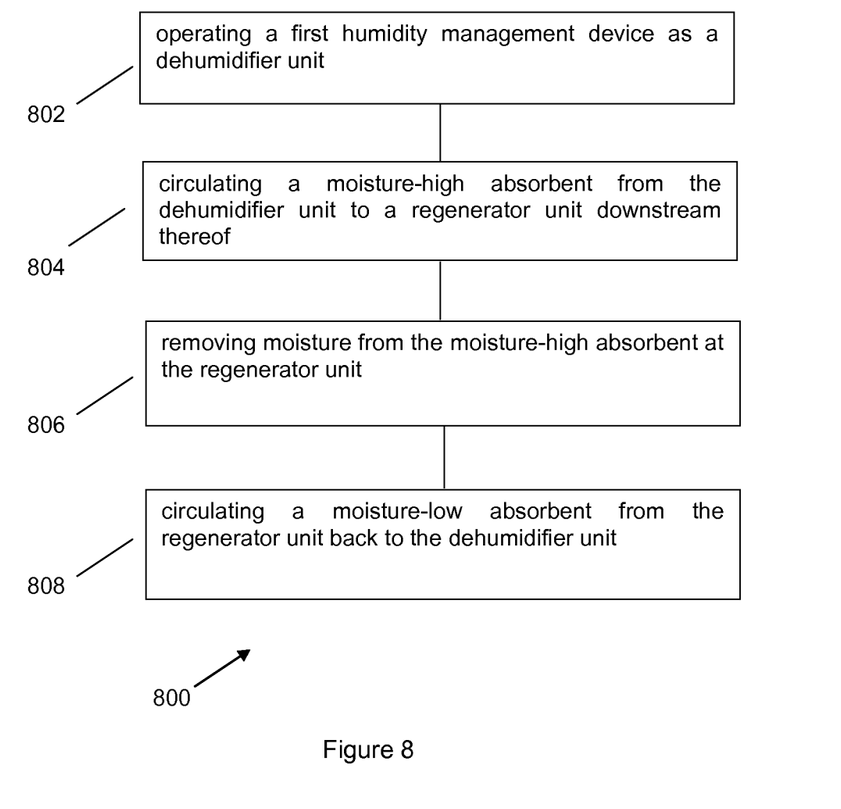
FIG. 8 shows a flow chart illustrating a method of operating an air-conditioning system according to an example embodiment.

FIG. 8 shows a flow chart illustrating a method of operating an air-conditioning system according to an example embodiment. At step 802, a first humidity management device as described above is operated as a dehumidifier unit. At step 804, a moisture-high absorbent is circulated from the dehumidifier unit to a regenerator unit downstream thereof. At step 806, moisture is removed from the moisture-high absorbent at the regenerator unit. At step 808, a moisture-low absorbent is circulated from the regenerator unit back to the dehumidifier unit.

The example embodiments as described above provide a humidity management device in which the effective sorbent carrying surface is significantly increased through provision of the rotating brush having a plurality of bristles, which may be porous. Put in another way, the liquid sorbent that is introduced into the device can have a higher retention time in the chamber than in conventional devices. As a result, a more thorough mixing of the liquid sorbent with the input air can be achieved, thereby providing effective removal of moisture from the air in some applications, and removal of moistures from the sorbent in other applications. An air-conditioning system using such humidity management device can advantageously provide the desired humidity level without high power consumption. Further, at least some of the power can be provided through renewable sources, such as a solar heater.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A humidity management device comprising:
    a chamber having a first end and a second end;
    an air inlet disposed adjacent the first end;
    an air outlet disposed adjacent the second end;
    a rotatable brush disposed between the first and second ends, the brush having a sorbent-carrying surface;
    a sorbent distribution part configured to distribute a sorbent over the sorbent-carrying surface; and
    a conveyor configured to transport a portion of the sorbent to the second end for distribution over the sorbent-carrying surface, wherein the conveyor comprises a tube having a rotatable loop therein;
    wherein the air inlet is configured to receive input air having a first humidity level; and
    wherein the air outlet is configured to draw said input air to contact the sorbent-carrying surface to thereby change a moisture content of said input air such that output air exiting the air outlet has a second humidity level different from the first humidity level.

2. The humidity management device as claimed claim 1, wherein the humidity management device comprises a sorbent inlet disposed adjacent the second end and configured to dispense a liquid sorbent onto the sorbent-carrying surface of the brush.

3. The humidity management device as claimed in claim 2, wherein the humidity management device further comprises:
    a sorbent reservoir disposed adjacent the first end;
    wherein the conveyor is configured to transport the portion of the sorbent collected at the sorbent reservoir to the second end for distribution over the sorbent-carrying surface.

4. The humidity management device as claimed in claim 3, wherein the conveyor comprises an Archimedes' screw having a lower end in fluid communication with the sorbent reservoir.

5. The humidity management device as claimed in claim 3, further comprising an actuator coupled to the conveyor to drive the conveyor.

6. The humidity management device as claimed in claim 5, wherein the actuator is further coupled to the brush to rotate the brush.

7. The humidity management device as claimed in claim 1, wherein the brush comprises a plurality of bristles, the bristles providing the sorbent-carrying surface.

8. The humidity management device as claimed in claim 7, wherein the bristles are hollow.

9. The humidity management device as claimed in claim 1, wherein the sorbent-carrying surface is porous.

10. The humidity management device as claimed in claim 1, operable as a dehumidifier, wherein the sorbent is configured to remove moisture from the input air such that the second humidity level is lower than the first humidity level.

11. The humidity management device as claimed in claim 10, wherein a temperature of the input air is higher than a temperature of the sorbent.

12. The humidity management device as claimed in claim 1, wherein the humidity management device is configured to operate as a desorber, wherein the sorbent is configured to release moisture into the input air such that the second humidity level is higher than the first humidity level.

13. The humidity management device as claimed in claim 12, wherein a temperature of the input air is lower than a temperature of the sorbent.

14. An air-conditioning system comprising:
    a dehumidifier comprising the humidity management device as claimed in claim 10;
    a regenerator disposed downstream of the dehumidifier, wherein the regenerator is configured to receive a moisture-high sorbent from the dehumidifier, and to remove moisture from said moisture-high sorbent; and
    a sorbent circuit configured to circulate the moisture-high sorbent from the dehumidifier to the regenerator and a moisture-low sorbent from the regenerator back to the dehumidifier.

15. The system as claimed in claim 14, further comprising a heater connected to the sorbent circuit between the dehumidifier and the regenerator, and configured to heat the moisture-high sorbent being circulated from the dehumidifier to the regenerator.

16. The system as claimed in claim 15, wherein the heater comprises a solar heater.

17. The system as claimed in claim 14, wherein the regenerator comprises a desorber comprising a humidity management device operable as a desorber.

18. The system as claimed in claim 14, wherein the regenerator comprises a pervaporator configured to separate and vaporize the moisture from the sorbent through a membrane.

19. The system as claimed in claim 14, further comprising a heat exchanger disposed downstream of the dehumidifier, the heat exchanger configured to receive the output air from the dehumidifier and cool said output air using a flow of waste air.

20. The system as claimed in claim 19, further comprising an evaporation humidifier disposed downstream of the heat exchanger for adiabatically cooling the air received from the heat exchanger.

21. A humidity management method comprising:
    providing a chamber having a first end and a second end, wherein an air inlet is disposed adjacent the first end, an air outlet is disposed adjacent the second end, and a rotatable brush is disposed between the first and second ends, the brush having a sorbent-carrying surface;
    distributing a sorbent over the sorbent-carrying surface;
    providing a conveyor configured to transport a portion of the sorbent to the second end for distribution over the sorbent-carrying surface, wherein the conveyor comprises a tube having a rotatable loop therein;
    supplying input air having a first humidity level to the chamber through the air inlet; and drawing said input air from the air inlet to the air outlet such that the input air contacts the sorbent-carrying surface to thereby change a moisture content of said input air and such that output air exiting the air outlet has a second humidity level different from the first humidity level.

22. The method as claimed in claim 21, wherein distributing a sorbent over the sorbent-carrying surface comprises transporting a portion of a liquid sorbent from a sorbent reservoir disposed adjacent the first end to the second end using an Archimedes' screw.

23. A method for operating an air-conditioning system, the method comprising:
    operating a first humidity management device as claimed in claim 1 as a dehumidifier;
    circulating a moisture-high absorbent from the dehumidifier to a regenerator downstream thereof;
    removing moisture from the moisture-high absorbent at the regenerator; and
    circulating a moisture-low absorbent from the regenerator back to the dehumidifier.

24. The method as claimed in claim 23, wherein the regenerator comprises a second humidity management device.

25. The method as claimed in claim 23, wherein the regenerator comprises a pervaporator and wherein removing the moisture from the moisture-high sorbent comprises separating and vaporizing the moisture using a membrane.

26. The method as claimed in claim 23, wherein circulating the moisture-high absorbent from the dehumidifier to the regenerator comprises heating the absorbent using a solar heater.

\* \* \* \* \*